W. F. WINN.
MOLD.
APPLICATION FILED JUNE 25, 1912.
1,069,509.
Patented Aug. 5, 1913.
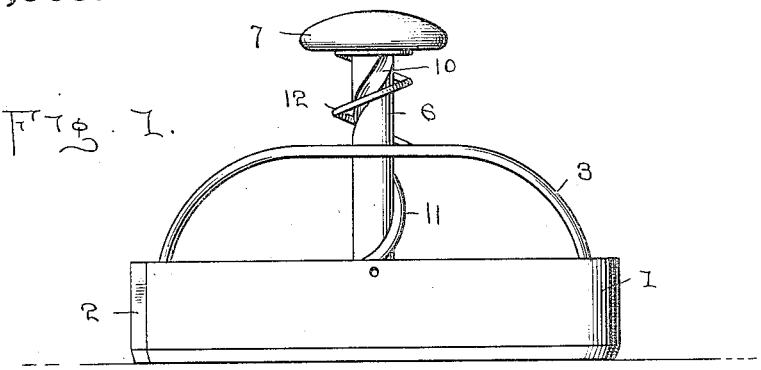
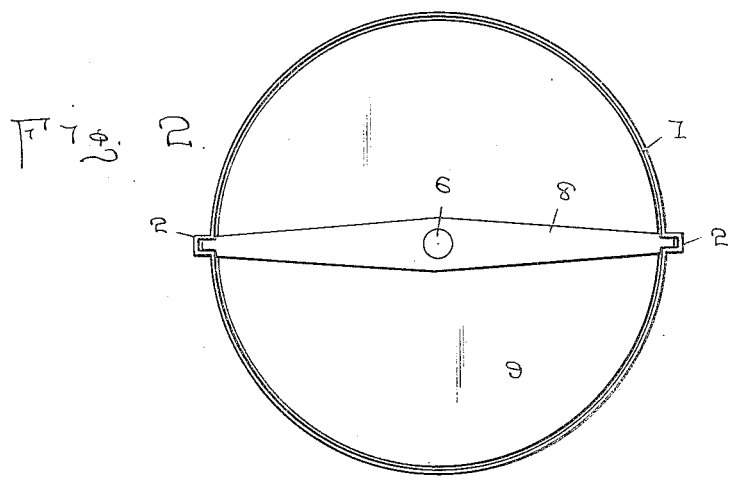
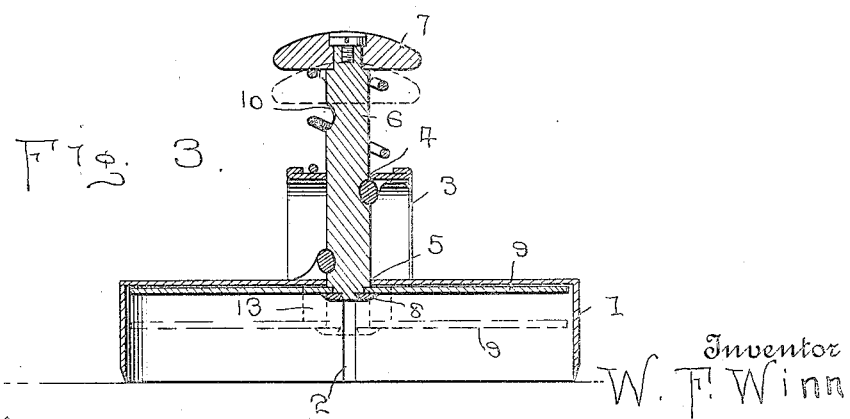
Witnesses
Thos. W. Riley
M. Newbrick
Inventor
W. F. Winn
By W. J. FitzGerald & Co.
Attorneys

UNITED STATES PATENT OFFICE.

WILLIAM F. WINN, OF BUTTE, MONTANA.

MOLD.

1,069,509.  Specification of Letters Patent.  Patented Aug. 5, 1913.

Application filed June 25, 1912. Serial No. 705,763.

*To all whom it may concern:*

Be it known that I, WILLIAM F. WINN, a citizen of the United States, residing at Butte, in the county of Silverbow and State of Montana, have invented certain new and useful Improvements in Molds; and I do hereby declare the following to be a full, clear, and exact description of the invention, such as will enable others skilled in the art to which it appertains to make and use the same.

This invention relates to molds, and is particularly adaptable for molding for forming into cakes Hamburg steaks, codfish, sausage and other chopped and plastic food stuffs.

The object of my invention is to provide a suitable receptacle for rapidly, sanitarily and uniformly forming the loose material into cakes of uniform shape and size, means within said cup for compressing the material within the receptacle, and additional means for loosening and ejecting the material within the mold.

Another object of the invention is to provide a mold having a false bottom, and means for spacing said false bottom predetermined distances from the bottom of said mold, whereby the mold may be adjusted to take up the desired amount of material.

A further object is to provide the mold with an adjustable false bottom and a knife for cutting the molded material from the false bottom.

Other objects will appear hereinafter.

In the accompanying drawings, in which is illustrated the preferred form of my invention, Figure 1 is a side elevation of a mold constructed in accordance with my invention. Fig. 2 is a bottom plan view thereof, and, Fig. 3 is a transverse sectional view through the mold.

Referring more particularly to the drawings, in which similar reference characters denote similar parts throughout the several views, 1 denotes a receptacle or cup which is preferably circular, and is provided at diametrically opposite points with outwardly directed channels 2. Secured to the top of the cup 1 is a suitable handle 3 provided with a suitable opening 4 registering with an opening 5 in the top of the cup.

Disposed within the openings 4 and 5 is a stem 6, provided at the upper end with a rotatable knob 7 and at the lower end with the loosely mounted blade 8. Positioned against the blade 8 and between said blade and the top of the cup is a plate 9, which conforms in shape to said cup and is rotatable with the stem 6. The portion of the stem 6 projecting above the cup 1 is provided with a spiral groove 10, within which is adapted for engagement the spiral thread 11, the latter being secured between the handle 3 and the top of the cup 1. The ends of the blade 8 are reduced and are slidably engaged within the channels 2, and when the stem 6 is depressed and rotated together with the plate 9 by means of the thread and groove 10 and 11, the blade 8 remains stationary and cuts from said plate any of the material adhering thereto. The stem 6 is returned to initial position after each downward stroke by a suitable spring 12, disposed between the rotatable knob and the handle 3.

It will be seen that by varying the distance from the lower open end of the cup 1 to the plate 9, the mold may be adjusted to various depths and thus be used for molding any desired predetermined amount of material. For accomplishing this, I provide my mold with one or more disks or washers 13, of various sizes, which are disposed between the top of the cup 1 and the plate 9, thereby spacing the plate from the cup and decreasing the distance between the lower edge of the cup and the plate, to facilitate molding different quantities of material.

What I claim is:—

A mold comprising a cup, guide channels in the wall of said cup, a knife slidable in said guide channels, a reciprocable stem rotatably secured in the top of said cup and in said knife, an ejector plate behind and engaging said knife and rotatable with said stem, and means for rotating said stem when it is reciprocated.

In testimony whereof I have signed my name to this specification in the presence of two subscribing witnesses.

WILLIAM F. WINN.

Witnesses:
LENA JACOBSON,
A. C. RODGER.